(12) United States Patent
Ono

(10) Patent No.: US 11,123,822 B2
(45) Date of Patent: Sep. 21, 2021

(54) MANUFACTURING METHOD FOR GLASS SUBSTRATE, METHOD FOR FORMING HOLE IN GLASS SUBSTRATE, AND APPARATUS FOR FORMING HOLE IN GLASS SUBSTRATE

(71) Applicant: AGC Inc., Chiyoda-ku (JP)

(72) Inventor: Motoshi Ono, Chiyoda-ku (JP)

(73) Assignee: AGC Inc., Chiyoda-ku (JP)

(*) Notice: Subject to any disclaimer, the term of this patent is extended or adjusted under 35 U.S.C. 154(b) by 801 days.

(21) Appl. No.: 15/472,636

(22) Filed: Mar. 29, 2017

(65) Prior Publication Data

US 2017/0282299 A1    Oct. 5, 2017

(30) Foreign Application Priority Data

Mar. 31, 2016  (JP) .............................. JP2016-072638
Mar. 27, 2017  (JP) .............................. JP2017-061906

(51) Int. Cl.
*B23K 26/382* (2014.01)
*B23K 26/402* (2014.01)
*B23K 103/00* (2006.01)

(52) U.S. Cl.
CPC .......... *B23K 26/382* (2015.10); *B23K 26/402* (2013.01); *B23K 2103/54* (2018.08)

(58) Field of Classification Search
CPC .... B23K 26/38; B23K 26/00; B23K 2103/54; B23K 26/382; B23K 26/402;
(Continued)

(56) References Cited

U.S. PATENT DOCUMENTS 5,665,136 A * 9/1997 Komachi ................ C03B 23/02
                                                    65/102
6,826,204 B2 * 11/2004 Kennedy ................ H01S 3/115
                                                    372/10
(Continued)

FOREIGN PATENT DOCUMENTS

JP       60052822 A  *  3/1985
JP       2004-74253      3/2004
(Continued)

OTHER PUBLICATIONS

Translation JP 2014 213338 (Year: 2020).*
(Continued)

*Primary Examiner* — Ibrahime A Abraham
*Assistant Examiner* — Frederick F Calvetti
(74) *Attorney, Agent, or Firm* — Oblon, McClelland, Maier & Neustadt, L.L.P.

(57) ABSTRACT

A manufacturing method for a glass substrate having a hole with a depth of d (μm) or more includes irradiating the glass substrate with a laser beam emitted from a $CO_2$ laser oscillator for an irradiation time t (μsec), to form a hole in the glass substrate. The laser beam is delivered to the glass substrate after being condensed at a focusing lens. A power density $P_d$ (W/cm²), defined by $$P_d = P_0/S$$

where $P_0$ and S are a power and a beam cross-sectional area of the laser beam just prior to entering the focusing lens, respectively, is 600 W/cm² or less. The irradiation time t (μsec) satisfies $$t \geq 10 \times d/(P_d)^{1/2}.$$

19 Claims, 2 Drawing Sheets

(58) Field of Classification Search
CPC ............ B23K 26/0626; B23K 26/0648; C03B 33/08; H01S 3/2232
USPC ............................. 219/121.6–121.86, 212.7
See application file for complete search history.

(56) References Cited

U.S. PATENT DOCUMENTS

| | | | | |
|---|---|---|---|---|
| 7,807,942 | B2* | 10/2010 | Shiozaki | B23K 26/38 |
| | | | | 219/121.68 |
| 8,257,603 | B2* | 9/2012 | Logunov | C03C 23/0025 |
| | | | | 216/65 |
| 9,102,011 | B2* | 8/2015 | Hosseini | B23K 26/0648 |
| 9,205,698 | B2* | 12/2015 | Horiuchi | H01L 21/486 |
| 9,321,126 | B2* | 4/2016 | Xu | B23K 26/00 |
| 9,415,465 | B2* | 8/2016 | Hirano | B23K 26/0734 |
| 2002/0088779 | A1* | 7/2002 | Neev | A61B 18/20 |
| | | | | 219/121.69 |
| 2002/0185474 | A1* | 12/2002 | Dunsky | B23K 26/389 |
| | | | | 219/121.7 |
| 2003/0156615 | A1* | 8/2003 | Kennedy | B23K 26/0624 |
| | | | | 372/55 |
| 2004/0173942 | A1* | 9/2004 | Kobayashi | B23K 26/40 |
| | | | | 264/400 |
| 2005/0069007 | A1* | 3/2005 | Kennedy | B23K 26/382 |
| | | | | 372/55 |
| 2005/0155956 | A1* | 7/2005 | Hamada | B23K 26/082 |
| | | | | 219/121.69 |
| 2006/0109874 | A1* | 5/2006 | Shiozaki | B23K 26/382 |
| | | | | 372/25 |
| 2007/0062919 | A1* | 3/2007 | Hamada | B23K 26/0626 |
| | | | | 219/121.71 |
| 2008/0299745 | A1* | 12/2008 | Morikazu | B28D 5/0011 |
| | | | | 438/463 |
| 2009/0067455 | A1* | 3/2009 | Murison | H01S 3/1003 |
| | | | | 372/20 |
| 2009/0194516 | A1* | 8/2009 | Deshi | H05K 3/0035 |
| | | | | 219/121.71 |
| 2010/0050692 | A1* | 3/2010 | Logunov | C03C 23/0025 |
| | | | | 65/31 |
| 2010/0111120 | A1* | 5/2010 | Shah | B23K 26/0624 |
| | | | | 372/25 |
| 2011/0240617 | A1* | 10/2011 | Xu | B23K 26/00 |
| | | | | 219/121.72 |
| 2015/0014286 | A1* | 1/2015 | Staupendahl | H01S 3/2232 |
| | | | | 219/121.61 |
| 2015/0044416 | A1* | 2/2015 | Hosseini | B23K 26/356 |
| | | | | 428/131 |
| 2015/0076113 | A1* | 3/2015 | Horiuchi | H01L 23/49827 |
| | | | | 216/84 |
| 2016/0159679 | A1* | 6/2016 | West | B23K 26/064 |
| | | | | 65/112 |
| 2016/0280580 | A1* | 9/2016 | Bohme | C03B 33/0222 |
| 2018/0057390 | A1* | 3/2018 | Hackert | B23K 26/53 |
| 2018/0062342 | A1* | 3/2018 | Comstock, II | B23K 26/0665 |
| 2018/0105451 | A1* | 4/2018 | Wieland | B23K 26/382 |
| 2020/0206844 | A1* | 7/2020 | Zediker | B23K 26/082 |

FOREIGN PATENT DOCUMENTS

| | | |
|---|---|---|
| JP | 2011-143434 | 7/2011 |
| JP | 2013-241301 | 12/2013 |
| JP | 2014-213338 | 11/2014 |
| JP | 2015-229167 | 12/2015 |

OTHER PUBLICATIONS

Hiroshi Ogura, et al., "Hole Drilling of Glass Substrates with a $CO_2$ Laser", Japanese Journal of Applied Physics, vol. 42, No. 5A, 2003, p. 2881-2886.

* cited by examiner

MANUFACTURING METHOD FOR GLASS SUBSTRATE, METHOD FOR FORMING HOLE IN GLASS SUBSTRATE, AND APPARATUS FOR FORMING HOLE IN GLASS SUBSTRATE

CROSS-REFERENCE TO RELATED APPLICATION

The present application is based on and claims benefit of priority under 35 U.S.C. § 119 of Japanese Patent Applications No. 2016-072638, filed Mar. 31, 2016 and No. 2017-061906, filed Mar. 27, 2017. The contents of the application are incorporated herein by reference in their entirety.

BACKGROUND OF THE INVENTION

1. Field of the Invention

The disclosure herein generally relates to a manufacturing method for a glass substrate, a method for forming a hole in a glass substrate, and an apparatus for forming a hole in a glass substrate.

2. Description of the Related Art

Conventionally, a technique for forming fine holes through a glass substrate by irradiating the glass substrate with a laser beam from a laser oscillator has been known.

For example, Japanese Unexamined Patent Application Publication No. 2013-241301 discloses a laser beam machine for processing glass fine holes that is provided with a pulse $CO_2$ laser oscillator, and various optical systems including focusing lenses.

In the laser beam machine for processing glass fine holes disclosed in Japanese Unexamined Patent Application Publication No. 2013-241301, a glass substrate is irradiated with a pulsed $CO_2$ laser beam emitted from a pulsed $CO_2$ laser oscillator. By irradiation with the $CO_2$ laser beam, the glass substrate is locally heated, and a fine hole is formed at the irradiated site.

SUMMARY OF THE INVENTION

It is a general object of at least one embodiment of the present invention to provide a manufacturing method for a glass substrate, a method for forming a hole in a glass substrate, and an apparatus for forming a hole in a glass substrate that substantially obviate one or more problems caused by the limitations and disadvantages of the related art.

The present invention provides a manufacturing method for a glass substrate having a hole with a depth of d (μm) or more. The manufacturing method includes irradiating the glass substrate with a laser beam emitted from a $CO_2$ laser oscillator for an irradiation time t (μsec), to form a hole in the glass substrate. The laser beam is delivered to the glass substrate after being condensed at a focusing lens. A power density $P_d$ (W/cm$^2$), defined by $$P_d = P_0/S, \qquad \text{formula (1)}$$

where $P_0$ and S are a power and a beam cross-sectional area of the laser beam just prior to entering the focusing lens, respectively, is 600 W/cm$^2$ or less. The irradiation time t (μsec) satisfies $$t \geq 10 \times d/(P_d)^{1/2}. \qquad \text{formula (2)}$$

Moreover, the present invention provides a method for forming a hole with a depth of d (μm) or more in a glass substrate. The method includes irradiating the glass substrate with a laser beam emitted from a $CO_2$ laser oscillator for an irradiation time t (μsec), to form a hole in the glass substrate. The laser beam is delivered to the glass substrate after being condensed at a focusing lens. A power density $P_d$ (W/cm$^2$), defined by $$P_d = P_0/S, \qquad \text{formula (1)}$$

where $P_0$ and S are a power and a beam cross-sectional area of the laser beam just prior to entering the focusing lens, respectively, is 600 W/cm$^2$ or less. The irradiation time t (μsec) satisfies $$t \geq 10 \times d/(P_d)^{1/2}. \qquad \text{formula (2)}$$

Furthermore, the present invention provides an apparatus for forming a hole with a depth of d (μm) or more in a glass substrate. The apparatus includes a $CO_2$ laser oscillator configured to emit a laser beam; and a focusing lens configured to condense the laser beam into the glass substrate. The glass substrate is irradiated with the laser beam for an irradiation time t (ρsec), to form a hole in the glass substrate. A power density $P_d$ (W/cm$^2$), defined by $$P_d = P_0/S, \qquad \text{formula (1)}$$

where $P_0$ and S are a power and a beam cross-sectional area of the laser beam just prior to entering the focusing lens, respectively, is 600 W/cm$^2$ or less. The irradiation time t (μsec) satisfies $$t \geq 10 \times d/(P_d)^{1/2}. \qquad \text{formula (2)}$$

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

In the following, an embodiment of the present invention will be described with reference to the accompanying drawings.

Manufacturing Method of Glass Substrate According to Embodiment

In the embodiment, a manufacturing method of a glass substrate having a hole with a depth of a desired depth d (μm) or more (in the following, referred to as a "first manufacturing method") is provided.

The first manufacturing method includes a step of irradiating a glass substrate with laser beam emitted from a $CO_2$ laser oscillator for an irradiation time t (μsec) or more, to form a hole with a desired depth d (μm) or more in the glass substrate.

In the following, with reference to FIG. 1, the first manufacturing method will be explained in detail.

(Hole Forming Apparatus)

Figure 1:
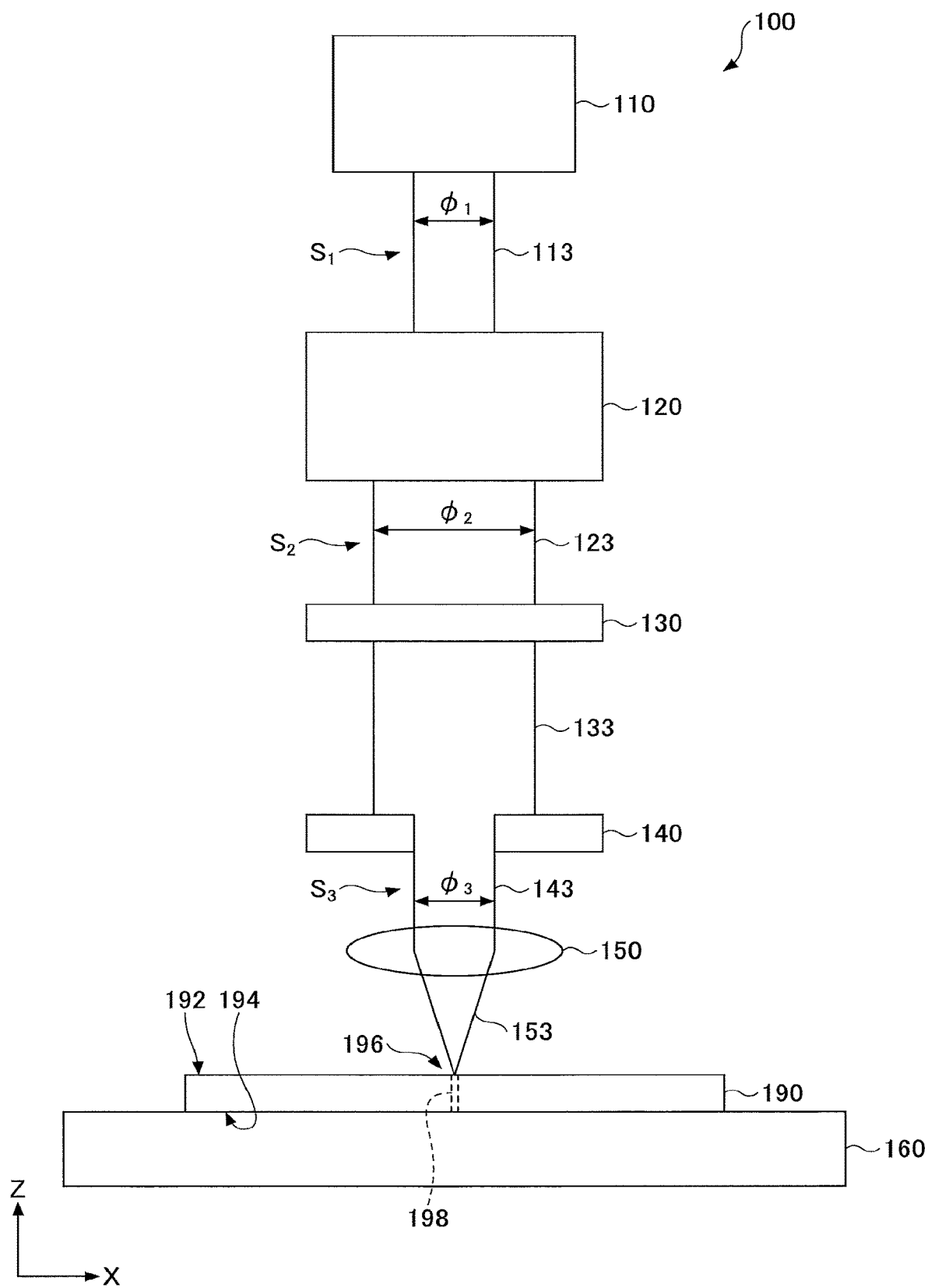
FIG. 1 is a diagram schematically depicting an example of a configuration of a hole forming apparatus according to an embodiment.

FIG. 1 schematically illustrates a configuration of a hole forming apparatus (in the following, referred to as a "first hole forming apparatus") that can be used when the first manufacturing method is performed.

As illustrated in FIG. 1, the first hole forming apparatus 100 includes a laser oscillator 110, various optical systems, and a stage 160.

In the optical system of the example illustrated in FIG. 1, in order from the laser oscillator 110 side, a beam expander 120, a wave plate 130, an aperture 140, and a focusing lens 150 are placed. The arrangement in the optical system is merely an example, and optical elements other than the focusing lens 150 may be omitted.

The laser oscillator 110 is a $CO_2$ laser oscillator, and can deliver $CO_2$ laser beam 113 toward the beam expander 120.

The laser oscillator 110 may be a pulsed $CO_2$ laser oscillator, and may be a continuous wave $CO_2$ laser oscillator. When the laser oscillator 110 is a pulsed $CO_2$ laser oscillator, a pulsed $CO_2$ laser beam is delivered from the laser oscillator 110. When the laser oscillator 110 is a continuous wave $CO_2$ laser oscillator, a continuous wave $CO_2$ laser beam is delivered from the laser oscillator 110.

A wavelength of the $CO_2$ laser beam (in the following, referred simply as "laser beam") 113 may be, for example, in a range from 9.2 μm to 9.8 μm. At this stage, a diameter and a beam cross-sectional area of the laser beam 113 are $\phi_1$ and $S_1$, respectively.

The beam expander 120 has a role of expanding the laser beam 113 delivered from the laser oscillator 110 at a predetermined ratio. For example, in the example illustrated in FIG. 1, the beam expander 120 expands the incident laser beam 113 having a diameter $\phi_1$ and a beam cross-sectional area $S_1$ to a laser beam 123 having a diameter $\phi_2$ and a beam cross-sectional area $S_2$, where $\phi_1 < \phi_2$ and $S_1 < S_2$.

An expansion rate is, for example, in a range of 1.5 times to 4.0 times.

The wave plate 130 is placed on a side opposite to the laser oscillator 110 via the beam expander 120. The wave plate 130 includes, for example, a quarter-wave plate or the like.

When the laser beam 123 is a linearly polarized laser beam, the wave plate 130 can convert the laser beam 123 into a circularly polarized laser beam. In the following, a laser beam emitted from the wave plate 130 will be referred to as "laser beam 133". When the laser beam delivered to the glass substrate is a circularly polarized laser beam, quality of the hole formed in the glass substrate (e.g. verticality, roundness and the like of the hole) is improved, compared with the case where a linearly polarized laser beam is delivered.

The aperture 140 is placed on a side opposite to the laser oscillator via the wave plate 130. The aperture 140 has a role of adjusting the incident laser beam 133 to a predetermined shape.

For example, in the example illustrated in FIG. 1, the aperture 140 adjusts the incident laser beam 133 having a diameter $\phi_2$ and a cross-sectional area $S_2$ to a laser beam 143 having a diameter $\phi_3$ and a cross-sectional area $S_3$, where $\phi_3 < \phi_2$ and $S_3 < S_2$.

The focusing lens 150 is placed on a side opposite to the laser oscillator via the aperture 140.

As illustrated in FIG. 1, the focusing lens 150 has a role of condensing the incident laser beam 143 at a predetermined position of a workpiece, i.e. the glass substrate 190.

The stage 160 has a role of supporting the glass substrate 190. The stage 160 may be a stage that can be moved in the X-Y direction.

As described above, at least one member of the beam expander 120, the wave plate 130, and the aperture 140 may be omitted.

When a hole is to be formed in the glass substrate 190 using the first hole forming apparatus 100 having the above-described configuration, first a glass substrate 190 is placed on the stage 160.

The glass substrate 190 has a first surface 192 and a second surface 194 opposite to each other. The glass substrate 190 is placed on the stage 160, so that the second surface 194 is on the stage 160 side.

The stage 160 may have a means for fixing the glass substrate 190. For example, the stage 160 may have a suction mechanism, by which the glass substrate 190 is suctioned and fixed on the stage 160. By using the stage 160 having the above-described configuration, position deviation of the glass substrate 190 during processing is inhibited.

Next, the laser beam 113 is delivered from the laser oscillator 110 toward the beam expander 120.

The laser beam 113 delivered to the beam expander 120 is there expanded, and converted into expanded laser beam 123. The expanded laser beam 123 delivered to the wave plate 130 is there converted into a circularly polarized laser beam 133. The circularly polarized laser beam 133 is delivered to the aperture 140. The circularly polarized laser beam 133 delivered to the aperture 140 is converted into a laser beam 143, by adjusting the shape.

Subsequently, the laser beam 143 that passed through the aperture 140 is delivered to the focusing lens 150. The laser beam 143 is condensed at the focusing lens 150, and converted into condensed laser beam 153 having a desired shape. The condensed laser beam 153 is delivered to an irradiation position 196 of the glass substrate 190.

By the condensed laser beam 153, temperatures at the irradiation position 196 of the glass substrate 190 and at a part just below the irradiation position rise, and a material existing in these regions is removed. According to the above-described operation, a hole 198 is formed at the irradiation position 196 of the glass substrate 190.

As illustrated in FIG. 1, the hole 198 formed in the glass substrate 190 may be a through-hole. Alternatively, the hole 198 may be a non-through hole.

Subsequently, by moving the stage 160 on the X-Y plane, and performing the same operations, a plurality of holes 198 can be formed in the glass substrate 190.

Here, the first manufacturing method has a feature that a power density (W/cm$^2$) of the laser beam 143 $P_d$ is 600 W/cm$^2$ or less, where power density is defined by $$P_d = P_0/S_3, \quad \text{formula (3)}$$

where $P_0$ (W) is a power of the laser beam 143 just prior to entering the focusing lens 150 and $S_3$ is a beam area of the laser beam 143 just prior to entering the focusing lens 150.

The power density $P_d$ (W/cm$^2$) is preferably 320 W/cm$^2$ or less, more preferably 160 W/cm$^2$ or less, and further preferably 80 W/cm$^2$ or less. Moreover, the power density $P_d$ (W/cm$^2$) is preferably 5 W/cm$^2$ or more, and more preferably 10 W/cm$^2$ or more, in order to perform the hole processing.

Moreover, the first manufacturing method has a feature that when a depth of the hole formed in the glass substrate 190 is d (μm) or more, a time in which the glass substrate 190 is irradiated with the condensed laser beam 153, i.e. an irradiation time t (μsec) satisfies $$t \geq 10 \times d/(P_d)^{1/2} \quad \text{formula (4)}$$

where $P_d$ represents the above-described power density $P_d$ (W/cm²).

For example, in the first manufacturing method, in the case of forming a hole with a depth d of 50 μm or more in the glass substrate 190, when the right hand side of formula (4) is denoted by $t_{min}$ (in the following, referred to as "minimum irradiation time"), the minimum irradiation time $t_{min} \approx 20$ μsec, assuming that the depth d=50 μm, and the power density $P_d$ (W/cm²)=600 W/cm². Therefore, in this case, the time t in which the glass substrate 190 is irradiated with the condensed laser beam 153 is selected so as to be greater than or equal to 20 μsec.

Moreover, for example, in the case of forming a hole with a depth d of 100 μm or more in the glass substrate 190, the minimum irradiation time $t_{min} \approx 41$ μsec, assuming that the depth d=100 μm, and the power density $P_d$ (W/cm²)=600 W/cm². Therefore, in this case, the time t in which the glass substrate 190 is irradiated with the condensed laser beam 153 is selected so as to be greater than or equal to 41 μsec.

In this way, in the first manufacturing method, the power density $P_d$ (W/cm²) of the laser beam 143 just prior to being delivered to the focusing lens 150 is sufficiently controlled to, for example, 600 W/cm² or less. Thus, an impact by the condensed laser beam 153 delivered to the glass substrate 190 can be sufficiently reduced, and occurrence of a crack in the glass substrate 190 can be significantly inhibited.

Moreover, the glass substrate 190 is irradiated with the condensed laser beam 153 for a sufficiently long time. Therefore, even if the power density $P_d$ (W/cm²) is relatively small, a hole with a desired depth of d or more can be formed in the glass substrate 190.

According to the above-described effect, in the first manufacturing method, a hole 198 having a desired depth of d or more can be formed in a state where occurrence of a crack is significantly inhibited.

Moreover, in the first manufacturing method, because the power density $P_d$ (W/cm²) can be made relatively small, occurrence of a crack can be inhibited even if the glass substrate 190 is irradiated for a long time.

(Laser Oscillator 110)

As described above, the first hole forming apparatus includes a $CO_2$ laser oscillator 110. The laser oscillator 110 may be a continuous wave $CO_2$ laser oscillator or may be a pulsed $CO_2$ laser oscillator.

Among the $CO_2$ laser oscillators, the continuous wave $CO_2$ laser oscillator can emit a continuous wave $CO_2$ laser beam.

Figure 2:
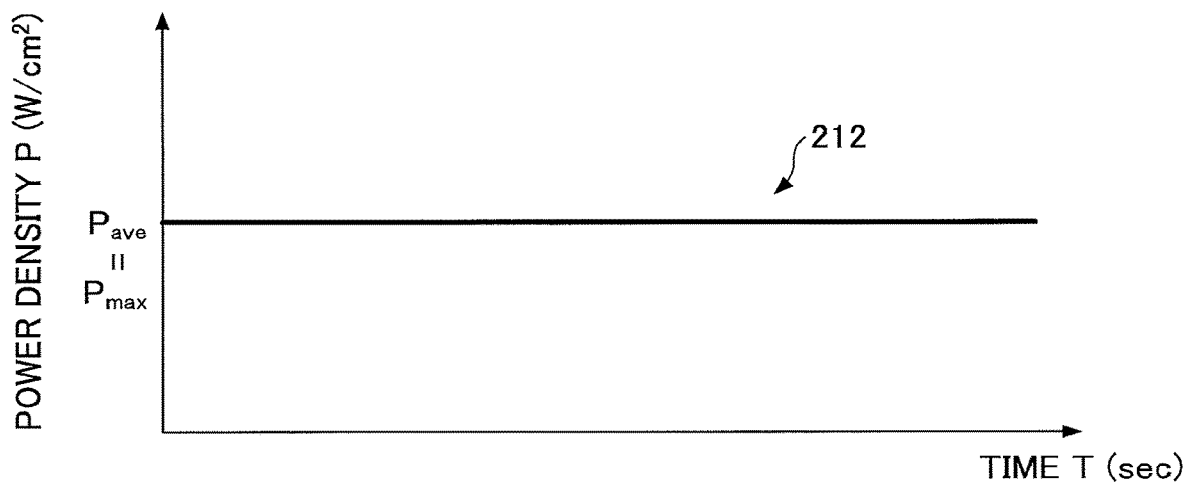
FIG. 2 is a diagram schematically depicting an example of an output profile of laser beam emitted from a continuous wave $CO_2$ laser oscillator.

FIG. 2 schematically depicts an example of an output profile of a laser beam emitted from the continuous wave $CO_2$ laser oscillator. In FIG. 2, the horizontal axis indicates time T (sec), and the vertical axis indicates a power of the laser beam. The vertical axis represents a power density (W/cm²) obtained by dividing a power of the laser beam by a beam cross-sectional area S of the laser beam. However, even if the vertical axis were to represent the power of the laser beam, a similar relationship will be obtained.

As illustrated in FIG. 2, the laser beam 212 emitted from the continuous wave $CO_2$ laser oscillator has a flat output profile that does not substantially vary with the time T. Therefore, a time average of the power density of the laser beam 212, i.e. an average power density (referred to as $P_{ave}$) substantially the same as the peak power density (referred to as $P_{max}$) of the laser beam 212.

In contrast, the pulsed $CO_2$ laser oscillator can emit a pulsed $CO_2$ laser beam.

Figure 3:
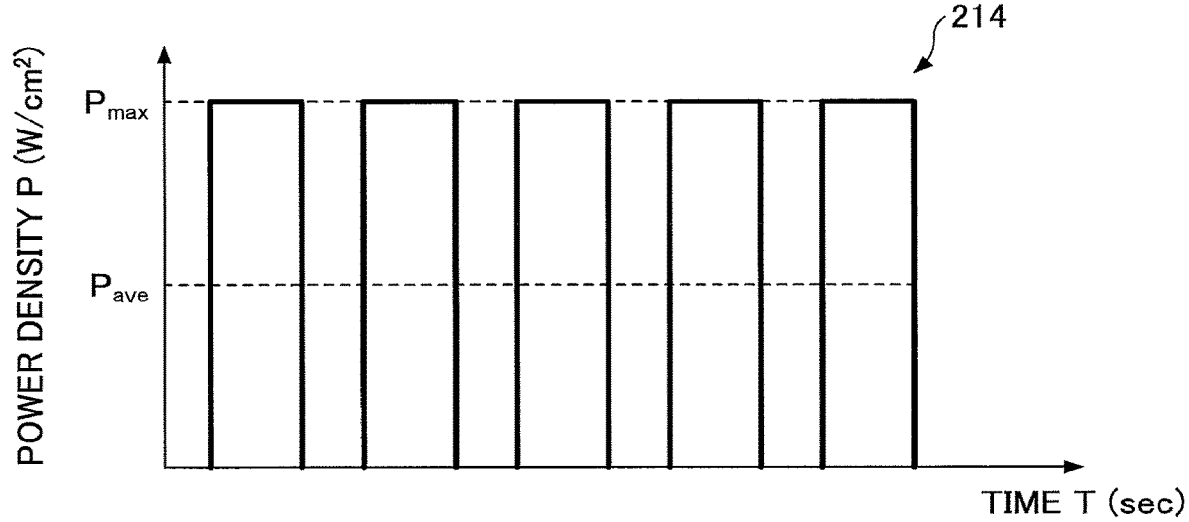
FIG. 3 is a diagram schematically depicting an example of an output profile of laser beam emitted from a pulsed $CO_2$ laser oscillator.

FIG. 3 schematically depicts an example of an output profile of a laser beam emitted from the pulsed $CO_2$ laser oscillator. In FIG. 3, the horizontal axis and the vertical axis are the same as in FIG. 2.

As illustrated in FIG. 3, a laser beam 214 emitted from the pulsed $CO_2$ laser oscillator has a pulsed output profile. Therefore, an average power density (referred to as $P_{ave}$) of the laser beam 214 has a different value than the peak power density (referred to as $P_{max}$) of the laser beam 214.

In this way, the laser beam 214 emitted from the pulsed $CO_2$ laser oscillator has the feature that $P_{ave}$ is different from $P_{max}$, whereas in the laser beam 212 emitted from the continuous wave $CO_2$ laser oscillator, $P_{ave}$ is the same as $P_{max}$.

In the present application, the power density $P_d$ (W/cm²) of the laser beam 143 expressed by formula (3) indicates the maximum power in output profile, i.e. $P_{max}$. Therefore, in the case where the laser oscillator 110 is a continuous wave $CO_2$ laser oscillator, a power density $P_d$ (W/cm²) of the laser beam 143 is substantially the same as an average of the power density. However, in the case where the laser oscillator 110 is a pulsed $CO_2$ laser oscillator, a power density $P_d$ (W/cm²) of the laser beam 143 is different from the average power density.

Moreover, the irradiation time t (μsec) in formula (4), when the condensed laser beam 153 has continuous waves as illustrated in FIG. 2, for example, indicates a total time for which the glass substrate 190 is actually irradiated with the condensed laser beam 153. In the case where the condensed laser bean 153 has pulsed output waves as illustrated in FIG. 3, for example, when the irradiation time t (μsec) is shorter than the pulse width, the irradiation time t indicates a total time for which the glass substrate 190 is actually irradiated with the condensed laser beam 153. However, when the irradiation time t is longer than the pulse width, the irradiation time t includes a non-emission time between pulses.

As described above, a manufacturing method for a glass substrate and an apparatus for forming a hole in the glass substrate according to the embodiment have been described with reference to FIGS. 1 to 3. However, the above descriptions are merely examples, and the present invention may be implemented in another configuration. For example, the present invention can be applied to a method for forming a non-through hole in a glass substrate.

EXAMPLE

Next, a practical example of the present invention will be described. In the following descriptions, examples 1 to 6 are practical examples, and examples 7 to 12 are comparative examples.

Example 1

Holes were formed in a glass substrate using the first hole forming apparatus, as illustrated in FIG. 1, to manufacture a glass substrate including holes. Moreover, for the obtained glass substrate, presence or absence of a crack and a depth of the hole (through/non-through) were evaluated. The depth of the hole was evaluated as follows. A desired depth d of the hole was set to a thickness of the glass substrate. When the hole formed in the glass substrate penetrated through the substrate, the desired depth d was determined to be obtained. When the hole did not penetrate through the substrate, the desired depth d was determined not to be obtained.

In the first hole forming apparatus, for the laser oscillator, a continuous wave $CO_2$ laser oscillator (DIAMOND- GEM100L-9.6: by COHERENT, INC.) was used. By using the continuous wave $CO_2$ laser oscillator, a continuous wave $CO_2$ laser beam with a beam diameter of $\phi_1$=3.5 mm was emitted.

The beam diameter $\phi_1$ of the continuous wave $CO_2$ laser beam was expanded by 3.5 times using a beam expander (accordingly, the beam diameter became $\phi_2$=3.5 mm×3.5=12.25 mm). Moreover, for the wave plate, a $\lambda/4$ wave plate was used. Furthermore, an aperture, through which the beam diameter of the laser beam $\phi_3$ became 9 mm after passing, was used.

For the focusing lens, an aspherical lens having a focal length of 25 mm was used. A peak power (i.e. average power) of the laser beam between the aperture and the focusin lens was 50 W. Therefore, the power density $P_d$ of the laser beam at this position was approximately 79 W/cm².

For the glass substrate, an alkali-free glass having a dimension of 50 mm×50 mm was used. A thickness of the glass substrate was set to 100 μm. Therefore, in Example 1, the desired depth d of the hole was 100 μm. The irradiation time t of the glass substrate with the laser beam was set to 120 μsec.

Here, in Example 1, the minimum irradiation time train, corresponding to the right hand side of the formula (4) was approximately 113 μsec. Therefore, the irradiation time t was longer than the minimum irradiation time $t_{min}$.

The number of holes to be formed in the glass substrate was set to 10000.

As a result of observation of the glass substrate after forming holes, the glass substrate did not reveal any abnormality such as a crack.

Moreover, holes had penetrated through the glass substrate.

Example 2

Holes were formed in a glass substrate by the same method as in Example 1, to manufacture a glass substrate including holes. Moreover, for the obtained glass substrate, presence or absence of a crack and a depth of the hole were evaluated.

However, in Example 2, the thickness of the glass substrate was set to 300 μm. Therefore, the desired depth d of the hole was set to 300 μm. Moreover, the irradiation time t was set to 380 μsec.

Here, in Example 2, the minimum irradiation time $t_{min}$, corresponding to the right hand side of the formula (4) was approximately 338 μsec. Therefore, the irradiation time t was longer than the minimum irradiation time $t_{min}$.

As a result of observation of the glass substrate after forming holes, the glass substrate did not reveal any abnormality such as a crack.

Moreover, holes had penetrated through the glass substrate.

Example 3

Holes were formed in a glass substrate by the same method as in Example 1, to manufacture a glass substrate including holes. Moreover, for the obtained glass substrate, presence or absence of a crack and a depth of the hole were evaluated.

However, in Example 3, the peak power (i.e. average power) of the laser beam between the aperture and the focusing lens was set to 100 W. Therefore, the power density $P_d$ of the laser beam at this position was approximately 157 W/cm².

Moreover, the irradiation time t was set to 80 μsec.

Here, in Example 3, the minimum irradiation time $t_{min}$, corresponding to the right hand side of the formula (4) was approximately 80 μsec. Therefore, the irradiation time t was equal to the minimum irradiation time $t_{min}$.

As a result of observation of the glass substrate after forming holes, the glass substrate did not reveal any abnormality such as a crack.

Moreover, holes had penetrated through the glass substrate.

Example 4

Holes were formed in a glass substrate by the same method as in Example 3, to manufacture a glass substrate including holes. Moreover, for the obtained glass substrate, presence or absence of a crack and a depth of the hole were evaluated.

However, in Example 4, the thickness of the glass substrate was set to 300 μm. Therefore, the desired depth d of the hole was set to 300 μm. Moreover, the irradiation time t was set to 260 μsec.

Here, in Example 4, the minimum irradiation time $t_{min}$, corresponding to the right hand side of the formula (4) was approximately 239 μsec. Therefore, the irradiation time t was longer than the minimum irradiation time $t_{min}$.

As a result of observation of the glass substrate after forming holes, the glass substrate did not reveal any abnormality such as a crack.

Moreover, holes had penetrated through the glass substrate.

Example 5

Holes were formed in a glass substrate by the same method as in Example 1, to manufacture a glass substrate including holes. Moreover, for the obtained glass substrate, presence or absence of a crack and a depth of the hole were evaluated.

However, in Example 5, as the laser oscillator, a pulsed $CO_2$ laser oscillator (by COHERENT, INC.) was used. By using the pulsed $CO_2$ laser oscillator, a pulsed $CO_2$ laser beam having a beam diameter $\phi_1$ of 3.5 mm was emitted.

Moreover, between the aperture and the focusing lens, the average power of the laser beam was set to 67 W, and the peak power of the laser beam was set to 201 W. Therefore, the power density $P_d$ of the laser beam between the aperture and the focusing lens was approximately 316 W/cm².

Moreover, the irradiation time t was set to 56 μsec.

Here, in Example 5, the minimum irradiation time $t_{min}$, corresponding to the right hand side of the formula (4) was approximately 56 μsec. Therefore, the irradiation time t was equal to the minimum irradiation time $t_{min}$.

As a result of observation of the glass substrate after forming holes, the glass substrate did not reveal any abnormality such as a crack.

Moreover, holes had penetrated through the glass substrate.

Example 6

Holes were formed in a glass substrate by the same method as in Example 5, to manufacture a glass substrate including holes. Moreover, for the obtained glass substrate, presence or absence of a crack and a depth of the hole were evaluated.

However, in Example 6, the thickness of the glass substrate was set to 300 μm. Therefore, the desired depth d of the hole was set to 300 μm. Moreover, the irradiation time t was set to 170 μsec.

Here, in Example 6, the minimum irradiation time $t_{min}$, corresponding to the right hand side of the formula (4) was approximately 169 μsec. Therefore, the irradiation time t was longer than the minimum irradiation time $t_{min}$.

As a result of observation of the glass substrate after forming holes, the glass substrate did not reveal any abnormality such as a crack.

Moreover, holes had penetrated through the glass substrate.

Example 7

Holes were formed in a glass substrate by the same method as in Example 5, to manufacture a glass substrate including holes. Moreover, for the obtained glass substrate, presence or absence of a crack and a depth of the hole were evaluated.

However, in Example 7, between the aperture and the focusing lens, the average power of the laser beam was set to 130 W, and the peak power of the laser beam was set to 390 W. Therefore, the power density $P_d$ of the laser beam between the aperture and the focusing lens was approximately 613 W/cm$^2$.

Moreover, the irradiation time t was set to 41 μsec.

Here, in Example 7, the minimum irradiation time $t_{min}$, corresponding to the right hand side of the formula (4) was approximately 40 μsec. Therefore, the irradiation time t was longer than the minimum irradiation time $t_{min}$.

As a result of observation of the glass substrate after forming holes, occurrence of a crack in the glass substrate was found. The occurrence rate of a crack per 10000 holes was 2%.

Holes had penetrated through the glass substrate.

Example 8

Holes were formed in a glass substrate by the same method as in Example 7, to manufacture a glass substrate including holes. Moreover, for the obtained glass substrate, presence or absence of a crack and a depth of the hole were evaluated.

However, in Example 8, the thickness of the glass substrate was set to 300 μm. Therefore, the desired depth d of the hole was set to 300 μm. Moreover, the irradiation time t was set to 122 μsec.

Here, in Example 8, the minimum irradiation time $t_{min}$, corresponding to the right hand side of the formula (4) was approximately 121 μsec. Therefore, the irradiation time t was longer than the minimum irradiation time $t_{min}$.

As a result of observation of the glass substrate after forming holes, occurrence of a crack in the glass substrate was found. The occurrence rate of a crack per 10000 holes was 5%.

Holes had penetrated through the glass substrate.

Example 9

Holes were formed in a glass substrate by the same method as in Example 5, to manufacture a glass substrate including holes. Moreover, for the obtained glass substrate, presence or absence of a crack and a depth of the hole were evaluated.

However, in Example 9, between the aperture and the focusing lens, the average power of the laser beam was set to 400 W, and the peak power of the laser beam was set to 1200 W. Therefore, the power density $P_d$ of the laser beam between the aperture and the focusing lens was approximately 1886 W/cm$^2$.

Moreover, the irradiation time t was set to 23 μsec.

Here, in Example 9, the minimum irradiation time $t_{min}$, corresponding to the right hand side of the formula (4) was approximately 23 μsec. Therefore, the irradiation time t was equal to the minimum irradiation time $t_{min}$.

As a result of observation of the glass substrate after forming holes, occurrence of a crack in the glass substrate was found. The occurrence rate of a crack per 10000 holes was 50%.

Holes had penetrated through the glass substrate.

Example 10

Holes were formed in a glass substrate by the same method as in Example 9, to manufacture a glass substrate including holes. Moreover, for the obtained glass substrate, presence or absence of a crack and a depth of the hole were evaluated.

However, in Example 10, the thickness of the glass substrate was set to 300 μm. Therefore, the desired depth d of the hole was set to 300 μm. Moreover, the irradiation time t was set to 72 μsec.

Here, in Example 10, the minimum irradiation time $t_{min}$, corresponding to the right hand side of the formula (4) was approximately 69 μsec. Therefore, the irradiation time t was longer than the minimum irradiation time $t_{min}$.

As a result of observation of the glass substrate after forming holes, occurrence of a crack in the glass substrate was found. The occurrence rate of a crack per 10000 holes was 80%.

Holes had penetrated through the glass substrate.

Example 11

Holes were formed in a glass substrate by the same method as in Example 1, to manufacture a glass substrate including holes. Moreover, for the obtained glass substrate, presence or absence of a crack and a depth of the hole were evaluated.

The irradiation time t was set to 30 μsec.

Here, in Example 11, the minimum irradiation time $t_{min}$, corresponding to the right hand side of the formula (4) was approximately 113 μsec. Therefore, the irradiation time t was shorter than the minimum irradiation time $t_{min}$.

As a result of observation of the glass substrate after forming holes, the glass substrate did not reveal any abnormality such as a crack.

However, because the irradiation time t was shorter than the minimum irradiation time $t_{min}$, a hole with the desired depth was not obtained, and the hole did not penetrate through the glass substrate.

Example 12

Holes were formed in a glass substrate by the same method as in Example 10, to manufacture a glass substrate including holes. Moreover, for the obtained glass substrate, presence or absence of a crack and a depth of the hole were evaluated.

The irradiation time t was set to 35 μsec.

Here, in Example 12, the minimum irradiation time $t_{min}$, corresponding to the right hand side of the formula (4) was approximately 69 μsec. Therefore, the irradiation time t was shorter than the minimum irradiation time $t_{min}$.

As a result of observation of the glass substrate after forming holes, occurrence of a crack in the glass substrate was found. The occurrence rate of a crack per 10000 holes was 40%.

Moreover, because the irradiation time t was shorter than the minimum irradiation time $t_{min}$, a hole with the desired depth was not obtained, and the hole did not penetrate through the glass substrate.

In TABLE 1, shown below, the manufacturing methods of the glass substrate including holes and the results of evaluation of respective Examples are presented as a while.

TABLE 1

| example | oscillation mode of laser | thickness of glass substrate (μm) | beam diameter $\phi_3$ (mm) | beam average power (w) | beam peak power (w) | power density $P_d$ (W/cm2) | minimum irradiation time $t_{min}$ (μsec) | irradiation time t (μsec) | occurrance rate of crack (%) | through/non-through |
|---|---|---|---|---|---|---|---|---|---|---|
| 1 | continuous wave | 100 | 9 | 50 | 50 | 79 | 113 | 120 | 0 | through |
| 2 | continuous wave | 300 | 9 | 50 | 50 | 79 | 338 | 380 | 0 | through |
| 3 | continuous wave | 100 | 9 | 100 | 100 | 157 | 80 | 80 | 0 | through |
| 4 | continuous wave | 300 | 9 | 100 | 100 | 157 | 239 | 260 | 0 | through |
| 5 | pulsed | 100 | 9 | 67 | 201 | 316 | 56 | 56 | 0 | through |
| 6 | pulsed | 300 | 9 | 67 | 201 | 316 | 169 | 170 | 0 | through |
| 7 | pulsed | 100 | 9 | 130 | 390 | 613 | 40 | 41 | 2 | through |
| 8 | pulsed | 300 | 9 | 130 | 390 | 613 | 121 | 122 | 5 | through |
| 9 | pulsed | 100 | 9 | 400 | 1200 | 1886 | 23 | 23 | 50 | through |
| 10 | pulsed | 300 | 9 | 400 | 1200 | 1886 | 69 | 72 | 80 | through |
| 11 | continuous wave | 100 | 9 | 50 | 50 | 79 | 113 | 30 | 0 | non-through |
| 12 | pulsed | 300 | 9 | 400 | 1200 | 1886 | 69 | 35 | 40 | non-through |

As presented in TABLE 1, it was found that by employing the manufacturing method for glass substrate including holes, depicted in Examples 1 to 6, occurrence of a crack was inhibited, and holes having a desired depth could be formed.

In the conventional hole processing technique disclosed in Japanese Unexamined Patent Application Publication No. 2013-241301, during the hole processing or after the hole processing, a crack may occur in the glass substrate. As a result, when the hole processing is actually performed, a irradiation time of the $CO_2$ laser beam (i.e. a pulse width of the $CO_2$ laser beam) is controlled so as to be as short as possible.

However, when the irradiation time of the $CO_2$ laser beam is shortened, it becomes difficult to form a sufficiently deep hole in the glass substrate. Therefore, in order to form a deep hole, a peak power of the pulsed $CO_2$ laser beam is required to be increased as much as possible.

However, when the peak power of the $CO_2$ laser beam is increased, an impact applied to the glass substrate upon being irradiated becomes great, and a crack will occur as a result.

The present invention can provide a method of manufacturing a glass substrate having a hole of a desired depth that can significantly inhibit occurrence of a crack. Moreover, the present invention can provide a method of forming a hole of a desired depth in a glass substrate that can significantly inhibit occurrence of a crack.

Furthermore, the present invention can provide an apparatus configured to form a hole of a desired depth in a glass substrate that can significantly inhibit occurrence of a crack.

Further, the present invention is not limited to these examples, but various variations and modifications may be made without deviating from the scope of the present invention.

What is claimed is:

1. A manufacturing method for a glass substrate having a hole with a depth of d (μm) or more, comprising:
    placing the glass substrate at a focal point of a laser beam emitted from a $CO_2$ laser oscillator;
    irradiating the glass substrate with the laser beam for at least a minimum irradiation time t (μsec), to apply heat on a portion of the glass substrate at the focal point, thereby removing a substance of the glass substrate at the focal point such that a hole is formed in the glass substrate at the focal point;
    wherein
    the laser beam is delivered to the focal point on the glass substrate after being condensed at an aspherical focusing lens,
    a power density $P_d$ (W/cm²) of the laser beam prior to entering the aspherical focusing lens is 600 W/cm² or less,
    wherein the power density $P_d$ is defined by $P_d = P_0/S$, where $P_0$ (W) and S (cm²) are a power and a beam cross-sectional area of the laser beam respectively, and
    the numerical value of the minimum irradiation time t (μsec) is determined by the mathematical value of $10 \times d/(P_d)^{1/2}$.

2. The manufacturing method according to claim 1, wherein the $CO_2$ laser oscillator is a continuous wave $CO_2$ laser oscillator.

3. The manufacturing method according to claim 1, wherein the $CO_2$ laser oscillator is a pulsed $CO_2$ laser oscillator.

4. The manufacturing method according to claim 1, wherein a wavelength of the laser beam emitted from the $CO_2$ laser oscillator is in a range from 9.2 μm to 9.8 μm.

5. The manufacturing method according to claim 1, wherein the hole is a through-hole.

6. A method for forming a hole with a depth of d (μm) or more in a glass substrate, comprising:
- placing the glass substrate at a focal point of a laser beam emitted from a $CO_2$ laser oscillator;
- irradiating the glass substrate with the laser beam for at least a minimum irradiation time t (μsec), to apply heat on a portion of the glass substrate at the focal point, thereby removing a substance of the glass substrate at the focal point such that a hole is formed in the glass substrate at the focal point;
- wherein
- the laser beam is delivered to the focal point on the glass substrate after being condensed at an aspherical focusing lens,
- a power density $P_d$ (W/cm$^2$) of the laser beam prior to entering the aspherical focusing lens is 600 W/cm$^2$ or less, wherein the power density $P_d$ is defined by $$P_d = P_0/S,$$

where $P_0$ (W) and S (cm$^2$) are a power and a beam cross-sectional area of the laser beam respectively, and
- the numerical value of the minimum irradiation time t (μsec) is determined by the mathematical value of $10 \times d/(P_d)^{1/2}$.

7. An apparatus for forming a hole with a depth of d (μm) or more in a glass substrate according to the method of claim 1, comprising:
- a support for positioning the glass substrate;
- a $CO_2$ laser oscillator configured to emit a laser beam;
- an aspherical focusing lens configured to condense the laser beam into a focal point on the glass substrate, wherein
- the laser beam is delivered to the focal point on the glass substrate after being condensed at the aspherical focusing lens,
- a power density $P_d$ (W/cm$^2$) of the laser beam prior to entering the aspherical focusing lens is 600 W/cm$^2$ or less, wherein the power density $P_d$ is defined by $$P_d = P_0/S,$$

where $P_0$ (W) and S (cm$^2$) are a power and a beam cross-sectional area of the laser beam.

8. The apparatus according to claim 7,
wherein the $CO_2$ laser oscillator is a continuous wave $CO_2$ laser oscillator.

9. The apparatus according to claim 7,
wherein the $CO_2$ laser oscillator is a pulsed $CO_2$ laser oscillator.

10. The apparatus according to claim 7,
wherein a wavelength of the laser beam emitted from the $CO_2$ laser oscillator is in a range from 9.2 μm to 9.8 μm.

11. The apparatus according to claim 7, further comprising an aperture configured to control the beam cross-sectional area of the laser beam between the $CO_2$ laser oscillator and the focusing lens.

12. The apparatus according to claim 11, further comprising a λ/4 wave plate between the $CO_2$ laser oscillator and the aperture.

13. The manufacturing method according to claim 1,
wherein a beam average power of the laser beam is 50 W or more.

14. The manufacturing method according to claim 1,
wherein the irradiation time t is 380 μsec or less.

15. The method according to claim 6,
wherein a beam average power of the laser beam is 50 W or more.

16. The method according to claim 6,
wherein the irradiation time t is 380 μsec or less.

17. The apparatus according to claim 7,
wherein a beam average power of the laser beam is 50 W or more.

18. The apparatus according to claim 7,
wherein the irradiation time t is 380 μsec or less.

19. The manufacturing method according to claim 1,
wherein the laser beam emitted from a $CO_2$ laser oscillator is circularly polarized.

* * * * *